(12) United States Patent
Tanaka et al.

(10) Patent No.: US 10,783,903 B2
(45) Date of Patent: Sep. 22, 2020

(54) SOUND COLLECTION APPARATUS, SOUND COLLECTION METHOD, RECORDING MEDIUM RECORDING SOUND COLLECTION PROGRAM, AND DICTATION METHOD

(71) Applicant: OLYMPUS CORPORATION, Hachioji-shi, Tokyo (JP)

(72) Inventors: Kazutaka Tanaka, Hachioji (JP); Osamu Nonaka, Sagamihara (JP); Kazuhiko Osa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 268 days.

(21) Appl. No.: 15/969,020

(22) Filed: May 2, 2018

(65) Prior Publication Data

US 2018/0322896 A1   Nov. 8, 2018

(30) Foreign Application Priority Data

May 8, 2017   (JP) .................................. 2017-092209

(51) Int. Cl.
| | | |
|---|---|---|
| *G10L 25/84* | (2013.01) | |
| *H04R 3/00* | (2006.01) | |
| *H04R 1/40* | (2006.01) | |
| *G10L 15/22* | (2006.01) | |
| *G10L 15/26* | (2006.01) | |

(Continued)

(52) U.S. Cl.
CPC .............. *G10L 25/84* (2013.01); *G10L 15/20* (2013.01); *G10L 15/22* (2013.01); *G10L 15/26* (2013.01); *G10L 15/265* (2013.01); *G10L 21/0202* (2013.01); *G10L 21/0208* (2013.01); *H04R 1/406* (2013.01); *H04R 3/005* (2013.01); *G10L 21/0232* (2013.01);

(Continued)

(58) Field of Classification Search
CPC ....... G10L 15/20; G10L 15/265; G10L 15/28; G10L 15/285; G10L 15/30; G10L 21/02; G10L 21/0202; G10L 21/0208; G10L 21/0216; G10L 2021/02161; G10L 2021/02163; G10L 2021/02165; G10L 2021/02166

See application file for complete search history.

(56) References Cited

U.S. PATENT DOCUMENTS

| | | | | |
|---|---|---|---|---|
| 5,220,639 A | * | 6/1993 | Lee ........................ | G10L 15/144 704/200 |
| 5,787,230 A | * | 7/1998 | Lee ........................ | G10L 15/063 704/235 |

(Continued)

FOREIGN PATENT DOCUMENTS

| | | |
|---|---|---|
| JP | 2000-106592 A | 4/2000 |
| JP | 2000-244609 A | 9/2000 |

*Primary Examiner* — Eric Yen
(74) *Attorney, Agent, or Firm* — Volpe and Koenig, P.C.

(57) ABSTRACT

A sound collection apparatus includes: a sound collection unit including a microphone configured to collect sound; a noise determination unit configured to determine noise in dictation based on voice collected by the sound collection unit; and a presentation unit configured to perform presentation based on a determination result by the noise determination unit. With this configuration, presentation is performed to indicate environmental noise at sound collection for dictation, which leads to improved efficiency of dictation work.

6 Claims, 16 Drawing Sheets

(51) Int. Cl.
  *G10L 21/0208* (2013.01)
  *G10L 15/20* (2006.01)
  *G10L 21/02* (2013.01)
  *G10L 21/0216* (2013.01)
  *G10L 21/0232* (2013.01)

(52) U.S. Cl.
  CPC ............... *G10L 2021/02163* (2013.01); *G10L 2021/02165* (2013.01); *G10L 2021/02166* (2013.01)

(56) References Cited

U.S. PATENT DOCUMENTS

| | | | |
|---|---|---|---|
| 6,405,170 B1* | 6/2002 | Phillips | G10L 15/22 379/88.02 |
| 9,076,450 B1* | 7/2015 | Sadek | G10L 15/34 |
| 9,734,822 B1* | 8/2017 | Sundaram | G10L 15/08 |
| 9,741,360 B1* | 8/2017 | Li | G10L 21/0232 |
| 9,966,059 B1* | 5/2018 | Ayrapetian | G10K 11/346 |
| 2002/0143533 A1* | 10/2002 | Lucas | G06F 40/174 704/235 |
| 2004/0086137 A1* | 5/2004 | Yu | G10L 21/0208 381/71.11 |
| 2005/0125224 A1* | 6/2005 | Myers | G10L 15/24 704/231 |
| 2006/0153360 A1* | 7/2006 | Kellermann | H04M 9/082 379/406.08 |
| 2008/0101556 A1* | 5/2008 | Kim | G10L 15/01 379/88.04 |
| 2008/0152094 A1* | 6/2008 | Perlmutter | G10L 15/30 379/88.01 |
| 2008/0317259 A1* | 12/2008 | Zhang | G10L 15/04 381/92 |
| 2009/0083032 A1* | 3/2009 | Jablokov | H04L 51/04 704/235 |
| 2009/0089053 A1* | 4/2009 | Wang | G10L 25/78 704/233 |
| 2009/0190774 A1* | 7/2009 | Wang | G10L 21/028 381/92 |
| 2010/0312546 A1* | 12/2010 | Chang | G06N 20/00 704/9 |
| 2011/0022389 A1* | 1/2011 | Kim | G10L 15/07 704/246 |
| 2011/0038489 A1* | 2/2011 | Visser | G01S 3/8006 381/92 |
| 2012/0123772 A1* | 5/2012 | Thyssen | G10L 21/0208 704/226 |
| 2012/0123773 A1* | 5/2012 | Zeng | G10L 21/0208 704/226 |
| 2012/0166188 A1* | 6/2012 | Chakra | G10L 21/0208 704/226 |
| 2013/0060365 A1* | 3/2013 | Jeong | G10L 19/20 700/94 |
| 2013/0282370 A1* | 10/2013 | Arakawa | H04R 3/005 704/226 |
| 2016/0148057 A1* | 5/2016 | Oh | H04N 7/183 348/143 |
| 2016/0173978 A1* | 6/2016 | Li | H04R 1/406 381/92 |
| 2016/0249132 A1* | 8/2016 | Oliaei | H04R 1/406 |
| 2016/0249141 A1* | 8/2016 | Verdooner | H04R 1/406 |
| 2017/0092265 A1* | 3/2017 | Sainath | G10L 15/16 |
| 2017/0278512 A1* | 9/2017 | Pandya | G10L 15/08 |
| 2018/0033447 A1* | 2/2018 | Ramprashad | G10L 21/028 |
| 2018/0286425 A1* | 10/2018 | Baek | G10L 25/30 |

* cited by examiner

SOUND COLLECTION APPARATUS, SOUND COLLECTION METHOD, RECORDING MEDIUM RECORDING SOUND COLLECTION PROGRAM, AND DICTATION METHOD

CROSS REFERENCE TO RELATED APPLICATION

This application claims the benefit of Japanese Application No. 2017-092209 filed in Japan on May 8, 2017, the contents of which are incorporated herein by this reference.

BACKGROUND OF THE INVENTION

Field of the Invention

The present invention relates to a sound collection apparatus, a sound collection method, a recording medium recording a sound collection program, and a dictation method, which are effective for dictation.

Description of Related Art

Conventionally, various kinds of microphones employed in sound collection apparatuses have been developed in accordance with usage purposes. For example, some developed sound collection apparatuses include a plurality of microphones and have a directionality switching function capable of switching a direction in which high sensitivity can be obtained. For example, a user switches directionality to specify which direction to increase the sensitivity in. In this manner, the sensitivity can be increased in a desired direction without changing directions of the microphones by a user.

Sound collection apparatuses are used for various purposes such as voice amplification, conversation between persons, and conversation between a person and a machine. Japanese Patent Application Laid-Open Publication No. 2000-244609 discloses such a technology that a noise level around a speaker is detected by fuzzy control and a volume of output sound is controlled based on the noise level.

Japanese Patent Application Laid-Open Publication No. 2000-106592 discloses a telephone apparatus having a voice response function and capable of excellently preventing false operation of the voice response function due to surrounding noise at handsfree call.

Such a sound collection apparatus is also used in a dictation system. Recent products as devices developed along with progress in voice recognition technologies include a dictation system configured to generate text through voice input. The dictation system talks in text with voice input, which has been conventionally performed by using a keyboard or the like.

The dictation system is used in various fields such as automation of dictation on a personal computer and inputting of mail sentences on a portable terminal. For example, in a medical field, the dictation system can be used to produce a medical record. Doctors need to have time necessary for use of various medical instruments and information terminals and contact with patients. The dictation system, which allows preparation of a medical record in a short time period, is extremely useful to the doctors.

In voice recognition processing, voice input is acquired through a microphone, an acoustic feature value is extracted from the acquired voice input, and text is determined based on a result of matching of the extracted feature value with an acoustic model. Thus, relatively high voice recognition performance can be obtained when only human voice is inputted through a microphone, but the voice recognition performance significantly decreases when the voice input includes a noise component other than dictation target voice.

However, for example, in clinical situations, a large number of medical professionals including doctors are present in the same space, and various kinds of environmental noise such as conversation among the medical professionals and operation sound of air conditioning facilities and various medical devices are generated. In particular, when any other person's voice is generated as environmental noise to dictation target voice, performance of voice recognition of the target voice degrades so that dictation cannot reliably performed in some cases.

SUMMARY OF THE INVENTION

A sound collection apparatus according to an aspect of the present invention includes: a sound collection unit including a microphone configured to collect sound; a noise determination unit configured to determine noise in dictation based on voice collected by the sound collection unit; and a presentation unit configured to perform presentation based on a determination result by the noise determination unit.

A sound collection method according to another aspect of the present invention includes: a procedure of collecting sound by a sound collection unit including a microphone; a procedure of determining noise in dictation based on voice collected by the sound collection unit; and a presentation procedure of performing presentation based on a determination result of the noise.

A recording medium according to another aspect of the present invention records a sound collection program configured to cause a computer to execute: a procedure of collecting sound by a sound collection unit including a microphone; a procedure of determining noise in dictation based on voice collected by the sound collection unit; and a presentation procedure of performing presentation based on a determination result of the noise.

A dictation method according to another aspect of the present invention includes: a procedure of reading, from a recording unit recording first sound collected by a sound collection unit, second sound acquired by performing noise reduction processing on the collected first sound, and information of noise in a duration of sound collection by the sound collection unit, the second sound and generating a document by performing first dictation processing through voice recognition of the read second sound; a procedure of generating, when the document cannot be generated by the first dictation processing, a document by reading the second sound and the noise information and performing second dictation processing through voice recognition of third sound acquired by adding noise based on the noise information to the read second sound; and a procedure of generating, when the document cannot be generated by the second dictation processing, a document by performing third dictation processing through voice recognition of fourth sound acquired by performing noise reduction processing on the read first sound.

The above and other objects, features and advantages of the invention will become more clearly understood from the following description referring to the accompanying drawings.

BRIEF DESCRIPTION OF THE DRAWINGS

FIG. 11A is an explanatory diagram for description of LED lighting control by a presentation control unit 1a;

FIG. 11B is an explanatory diagram for description of LED lighting control by the presentation control unit 1a;

DETAILED DESCRIPTION OF PREFERRED EMBODIMENTS

An embodiment of the present invention will be described in detail below with reference to the accompanying drawings.

First Embodiment

Figure 1:
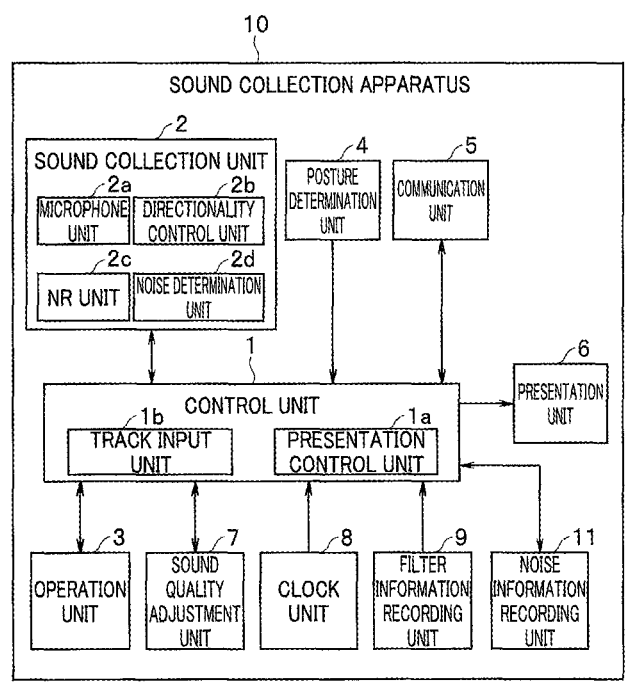
FIG. 1 is a block diagram illustrating a sound collection apparatus according to a first embodiment of the present invention.
Figure 2:
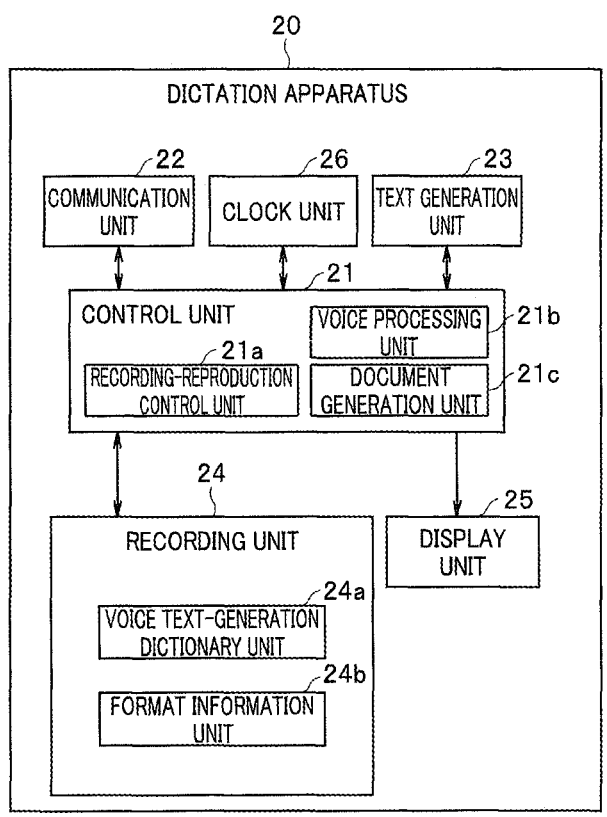
FIG. 2 is a block diagram illustrating a dictation apparatus configured to receive a voice file from the sound collection apparatus illustrated in FIG. 1 and perform dictation.
Figure 3:
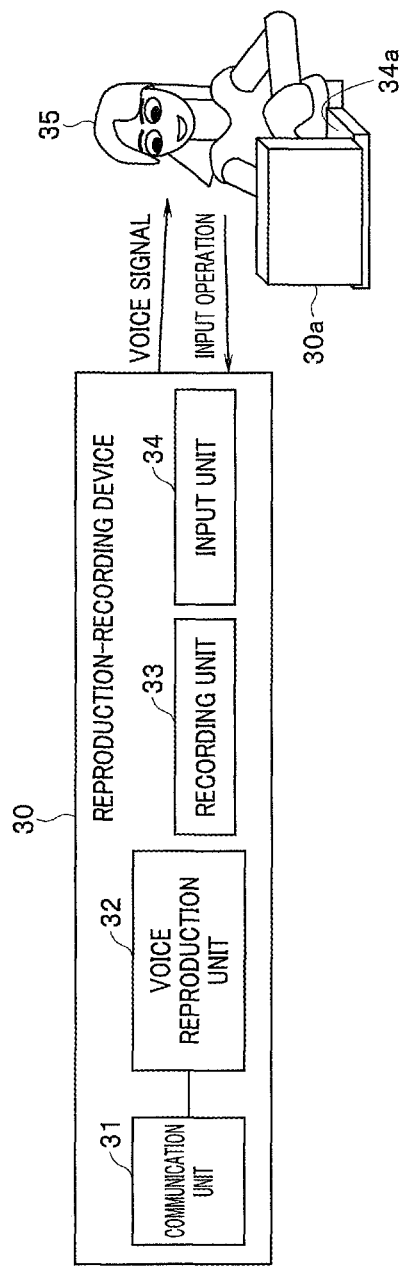
FIG. 3 is an explanatory diagram illustrating a reproduction-recording device configured to receive a voice file from the sound collection apparatus illustrated in FIG. 1 and perform dictation by manual input.

FIG. 1 is a block diagram illustrating a sound collection apparatus according to a first embodiment of the present invention. FIG. 2 is a block diagram illustrating a dictation apparatus configured to receive a voice file from the sound collection apparatus illustrated in FIG. 1 and perform dictation. FIG. 3 is an explanatory diagram illustrating a reproduction-recording device configured to receive a voice file from the sound collection apparatus illustrated in FIG. 1 and perform dictation by manual input.

Note that the present embodiment describes an example in which the sound collection apparatus and the dictation apparatus are separately provided, but the apparatuses illustrated in FIGS. 1 and 2 may be integrated to obtain, for example, an IC recorder having functions illustrated in FIGS. 1 and 2. Alternatively, the dictation function illustrated in FIG. 2 may be included in the sound collection apparatus illustrated in FIG. 1 to obtain, for example, a microphone apparatus having a dictation function.

Figure 4:
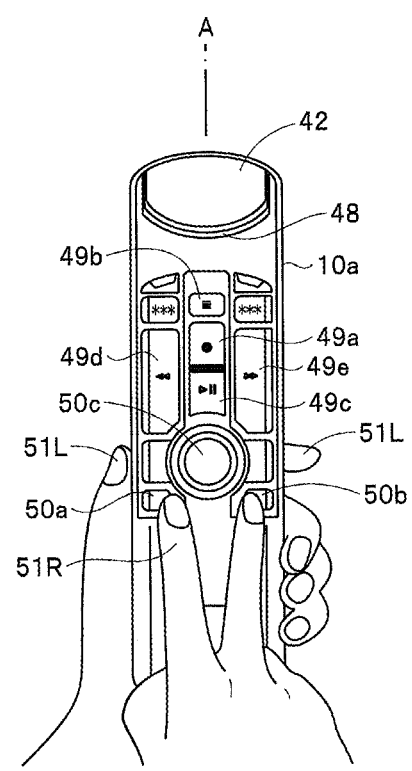
FIG. 4 is an explanatory diagram illustrating exemplary appearance of a sound collection apparatus (microphone apparatus) having a dictation function and including components illustrated in FIGS. 1 and 2.
Figure 5:
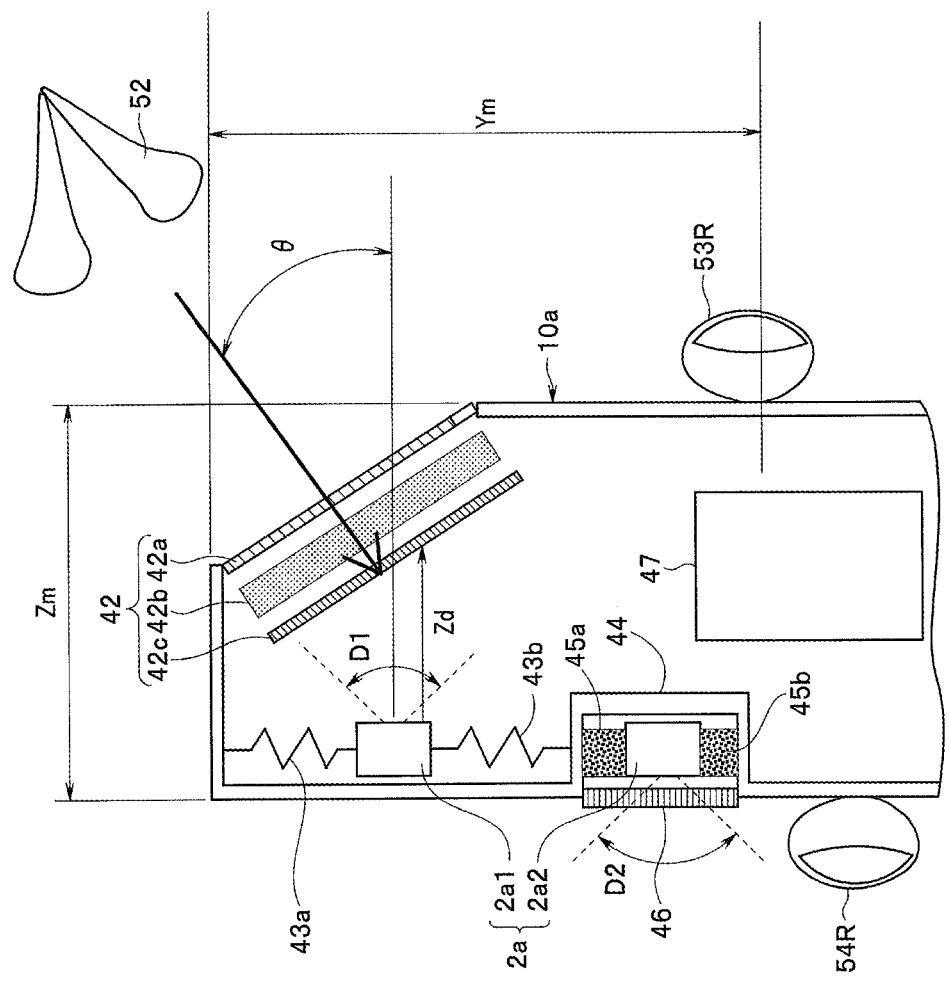
FIG. 5 is an explanatory diagram for description of a configuration of a microphone unit 2a including microphones 2a1 and 2a2 in the sound collection apparatus.

FIG. 4 is an explanatory diagram illustrating exemplary appearance of a sound collection apparatus (microphone apparatus) having a dictation function and including components illustrated in FIGS. 1 and 2. FIG. 5 is an explanatory diagram for description of a configuration of a microphone unit 2a including microphones 2a1 and 2a2 in the sound collection apparatus.

According to the present embodiment, for example, at dictation work, it is possible to detect environmental noise, which hinders voice recognition performance, before voice production and allow a dictation operator to recognize dictation environment by presenting a result of the detection. For example, the dictation operator can determine, before voice production, whether the dictation operator is in environment in which dictation is possible. According to the present embodiment, voice recognition performance can be improved by changing a sound collection characteristic based on a result of detection of environmental noise.

The following first describes the configuration of the microphone unit 2a with reference to FIGS. 4 and 5. FIG. 4 illustrates a state in which a user operates a sound collection apparatus 10 with a right hand 51R while grasping a housing 10a of the sound collection apparatus 10 with a left hand 51L, when viewed from a front side of the sound collection apparatus 10. FIG. 5 schematically illustrates disposition of internal components of the sound collection apparatus 10 at a section taken along line A in FIG. 4 when viewed from a left side. FIG. 5 illustrates a state in which the user grasps front and back surfaces of the housing 10a with a thumb 53R and an index finger 54R of the right hand.

A filter unit 42 is disposed at an upper end of the front surface of the housing 10a and positioned obliquely tilted relative to a longitudinal direction of the housing 10a. The filter unit 42 blocks an opening provided at the upper end of the front surface side of the housing 10a. The filter unit 42 has a three-layer structure in which a relatively coarse mesh metal unit 42a, a non-woven fabric 42b, and a relatively fine mesh metal unit 42c are provided in this order from the external side of the housing 10a to the internal side thereof. The filter unit 42 removes pop noise in voice emitted from a mouth 52.

The front microphone 2a1 is disposed at a position facing to the filter unit 42 on the back surface side inside the housing 10a. A housing part 44 in which the back microphone 2a2 is disposed is provided below the front microphone 2a1 on the back surface side inside the housing 10a. An elastic member 43b such as rubber is disposed between an upper surface of the housing part 44 and a bottom surface of the front microphone 2a1. An elastic member 43a such as rubber is disposed between an upper surface of the front microphone 2a1 and an upper surface of the housing 10a. The elastic members 43a and 43b allow the front microphone 2a1 to be held in the housing 10a and reduction of influence of vibration occurring to the housing 10a on the microphone 2a1. In particular, the elastic members 43a and 43b can reduce influence of vibration from the fingers 53R and 54R.

The housing part 44 is configured as a recess provided on the back surface of the housing 10a and blocked by a blockage member 46 provided with a large number of small holes. The back microphone 2a2 is disposed in the recess of the housing part 44. An elastic member 45a such as urethane is disposed between an upper surface of the microphone 2a2 and an upper surface of the recess. An elastic member 45b such as urethane is disposed between a bottom surface of the microphone 2a2 and a bottom surface of the recess. The elastic members 45a and 45b hold the microphone 2a2 in the recess.

A substrate 47 on which, for example, a component for each circuit illustrated in FIGS. 1 and 2 is mounted is disposed on a lower side inside the housing 10a.

The front microphone 2a1 has such a directional characteristic that sound can be collected in a sound collection range D1 illustrated with dashed lines in FIG. 5. The back microphone 2a2 has such a directional characteristic that sound can be collected in a sound collection range D2 illustrated with dashed lines in FIG. 5. In the present embodiment, an overall directional characteristic of the microphone unit 2a including the front microphone 2a1 and the back microphone 2a2 can be electrically controlled as described later.

Note that a thickness of the housing 10a is denoted by Zm, and a distance (microphone depth) between the front microphone 2a1 and the filter unit 42 in a horizontal direction is denoted by Zd. The thickness Zm is desirably as small as possible to reduce a thickness of the apparatus. The microphone depth Zd is set to be a distance sufficient to avoid generation of distortion in voice due to influence of airflow at sound collection. Since material of cushion members used as the elastic members 45a and 45b is different from material of cushion members used as the elastic members 43a and 43b, a too large height Ym between the upper surface of the housing 10a and the bottom surface of the housing part 44 is avoided.

As illustrated in FIG. 1, a control unit 1 is provided to a sound collection apparatus 10. The control unit 1 includes a processor such as a CPU and may be configured to operate in accordance with a computer program stored in a memory (not illustrated) to control each component. The computer program may be partially replaced with a hardware electronic circuit.

A sound collection unit 2 includes the microphone unit 2a including a plurality of microphones. In the example illustrated in FIG. 5, the microphone unit 2a includes two microphones of the front microphone 2a1 and the back microphone 2a2. The microphone unit 2a collects surrounding sound, converts the collected sound into a voice signal, and outputs the voice signal. The sound collection unit 2 includes a directionality control unit 2b configured to control directionality of sound collection by the microphone unit 2a under control of the control unit 1. That is, the directionality control unit 2b can control a direction (hereinafter referred to as a beam direction) in which highest sensitivity is obtained at sound collection by the microphone unit 2a, and a range of sound collection.

Figure 6:
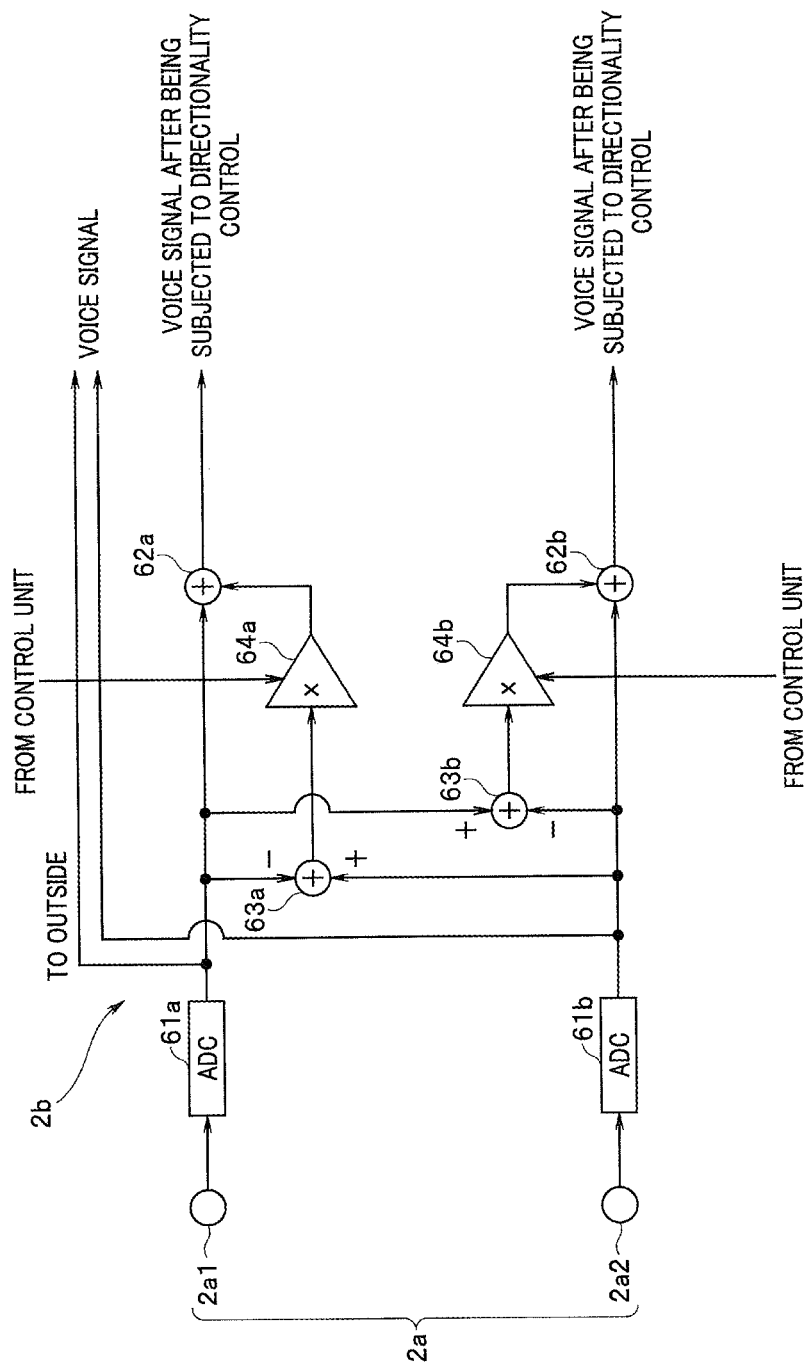
FIG. 6 is a circuit diagram illustrating an exemplary specific configuration of a directionality control unit 2b in FIG. 1.

FIG. 6 is a circuit diagram illustrating an exemplary specific configuration of the directionality control unit 2b in FIG. 1.

The directionality control unit 2b includes AD converters (ADC) 61a and 61b configured to convert outputs from the two microphones 2a1 and 2a2, respectively, into digital signals. The ADC 61a converts a voice signal from the microphone 2a1 into a digital signal and outputs the digital signal to adders 62a and 63a. The ADC 61b converts a voice signal from the microphone 2a2 into a digital signal and outputs the digital signal to adders 62b and 63b.

The adder 63a subtracts the output of the ADC 61a from the output of the ADC 61b, and outputs a result of the subtraction to a multiplier 64a. The adder 63b subtracts the output of the ADC 61b from the output of the ADC 61a, and outputs a result of the subtraction to a multiplier 64b.

First and second multiplication coefficients are supplied to control ends of the multiplier 64a and the multiplier 64b, respectively, from the control unit 1. The multiplier 64a multiplies the output of the adder 63a by the first multiplication coefficient, and outputs a result of the multiplication to the adder 62a. The multiplier 64b multiplies the output of the adder 63b by the second multiplication coefficient and outputs a result of the multiplication to the adder 62b. The adder 62a adds the output of the ADC 61a and the output of the multiplier 64a, and outputs a result of the addition. The adder 62b adds the output of the ADC 61b and the output of the multiplier 64b, and outputs a result of the addition.

The microphone 2a1 has such a directional characteristic that highest sensitivity is obtained for voice obliquely from above the front surface of the housing 10a. Hereinafter, voice collected by the microphone 2a1 is referred to as primary voice. The microphone 2a2 has such a directional characteristic that highest sensitivity is obtained for voice in the horizontal direction from the back surface of the housing 10a. Hereinafter, voice collected by the microphone 2a2 is referred to as secondary voice.

The result of the addition by the adder 62a corresponds to a result of addition of the primary voice and the secondary voice at distribution in accordance with the first multiplication coefficient. The addition corresponds to increase of the sound collection range of the microphone 2a1 toward the sound collection range side of the microphone 2a2 in accordance with the first multiplication coefficient. Similarly, the result of the addition by the adder 62b corresponds to a result of addition of the secondary voice and the primary voice at distribution in accordance with the second multiplication coefficient. The addition corresponds to increase of the sound collection range of the microphone 2a2 toward the sound collection range side of the microphone 2a1 in accordance with the second multiplication coefficient.

The output of each of the adders 62a and 62b may be outputted as individual voice data. For example, the output of the adder 62a may be outputted as primary voice data, and the output of the adder 62b may be outputted as secondary voice data. Alternatively, the outputs of the adders 62a and 62b may be synthesized and outputted as one piece of voice data.

In this manner, the sound collection unit 2 can narrow, widen, and change sound directionality by controlling balance between the primary voice and the secondary voice from the microphones 2a1 and 2a2. That is, the voice data outputted from the adders 62a and 62b corresponds to voice output with controlled spread of a sound collection range extending over the front and back sides. The spread can be reduced by increasing the first and second multiplication coefficients at the multipliers 64a and 64b. The spread can be increased by decreasing the multiplication coefficients. In addition, a direction (beam direction) of the sound collection range can be adjusted by setting the first and second multiplication coefficients as appropriate. Note that, hereinafter, the sound collection range of the microphone unit 2a refers to an overall sound collection range configured of the microphones 2a1 and 2a2 after controlling directionality.

In the present embodiment, the voice signals from the ADCs 61a and 61b can be directly output. The voice signals from the ADCs 61a and 61b can be used by an external circuit to perform directionality control.

The sound collection unit 2 includes a noise reduction (NR) unit 2c. The NR unit 2c removes, under control of the control unit 1, noise from a voice signal acquired by the microphone unit 2a.

Figure 7:
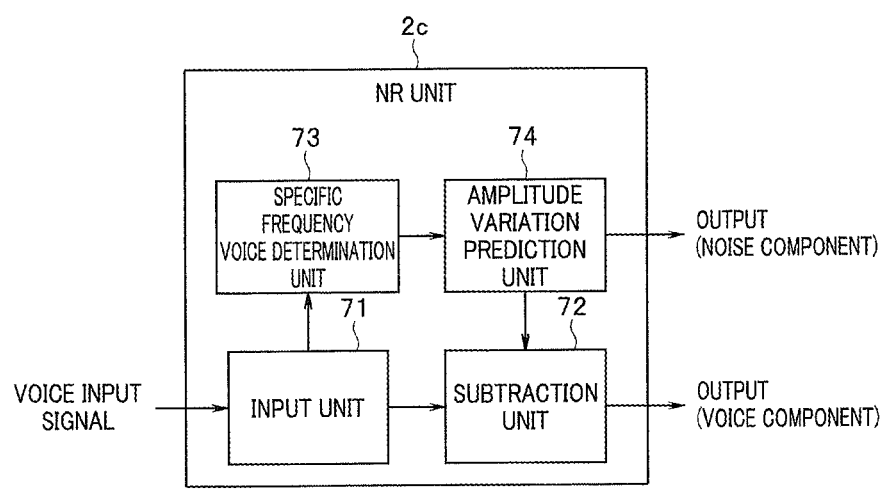
FIG. 7 is a circuit diagram illustrating an exemplary specific configuration of an NR unit 2c in FIG. 1.

FIG. 7 is a circuit diagram illustrating an exemplary specific configuration of the NR unit 2c illustrated in FIG. 1. Note that FIG. 7 illustrates a circuit configured to process voice data of a single system. Two systems of circuits each having a configuration same as the configuration of the circuit illustrated in FIG. 7 are used to process two voice signals from the microphones 2a1 and 2a2.

As illustrated in FIG. 7, each voice signal from the directionality control unit 2b is supplied to an input unit 71. The input unit 71 receives the voice signal thus inputted, and outputs the voice signal to a subtraction unit 72 and a specific frequency voice determination unit 73. The specific frequency voice determination unit 73 performs frequency analysis of the inputted voice signal to calculate a frequency of a noise component.

Unlike surrounding noise, voice has a sound pattern, a frequency characteristic of which largely changes in accordance with emotional expression of words and syllables and wording. However, noise has a largely changing sound magnitude (amplitude) rather than a difference in a frequency characteristic, and is clearly different from human voice, which has a slightly changing sound magnitude. Thus, the specific frequency voice determination unit 73 determines a noise frequency to be a specific frequency having a hardly changing frequency characteristic, and determines a voice component to be a component having a changing frequency characteristic. The specific frequency voice determination unit 73 outputs a result of the determination to an amplitude variation prediction unit 74.

The amplitude variation prediction unit 74 determines amplitude variation at the specific frequency to be noise-level variation based on the determination result from the specific frequency voice determination unit 73, and predicts the variation. The amplitude variation prediction unit 74 directly outputs a result of the prediction as prediction of the noise-level variation and also provides the result to the subtraction unit 72. The subtraction unit 72 removes a noise component from an inputted voice signal by subtracting the result of the prediction by the amplitude variation prediction unit 74 from the voice signal, and outputs the voice signal.

In this manner, the sound collection unit 2 digitalizes voice collected by the microphone unit 2a and outputs, to the control unit 1, voice signals before and after directionality control and a voice signal provided with noise reduction processing by the NR unit 2c.

In the present embodiment, the sound collection unit 2 includes a noise determination unit 2d. The noise determination unit 2d determines any environmental noise in collected voice. For example, the noise determination unit 2d may determine the environmental noise based on a synthesis signal of voice signals obtained by the microphones 2a1 and 2a2, or may determine the environmental noise based on a voice signal obtained by any one of the microphones 2a1 and 2a2, for example, the back microphone 2a2. For example, the noise determination unit 2d may calculate a mean square of a synthesis signal of voice signals obtained by the microphones 2a1 and 2a2 and may output the calculated value of the mean square as environmental noise. Alternatively, for example, the noise determination unit 2d may calculate a mean square of a voice signal obtained by the back microphone 2a2 and may output the calculated value of the mean square as environmental noise.

Note that the noise determination unit 2d may determine environmental noise by using the outputs of the ADCs 61a and 61b of the directionality control unit 2b illustrated in FIG. 6. Alternatively, the noise determination unit 2d may determine environmental noise based on a voice signal provided with a predetermined directional characteristic through directionality control by the directionality control unit 2b.

Alternatively, the noise determination unit 2d may determine environmental noise based on a voice signal in a predetermined frequency band among voice obtained by the microphone unit 2a. Alternatively, for example, the noise determination unit 2d may determine environmental noise based on a voice signal having a predetermined voice characteristic among voice obtained by the microphone unit 2a. For example, the noise determination unit 2d may extract, based on a voice characteristic, a voice signal attributable to speech by a person among voice obtained by the microphone unit 2a, and determine environmental noise based on the extracted voice signal.

For example, a voice of any person other than a voice recognition target may adversely affect voice recognition. Whether voice recognition performance is affected can be easily determined in some cases by determining environmental noise based on an output of voice component. Thus, for example, the noise determination unit 2d may determine environmental noise based on a voice component output from the subtraction unit 72 of the NR unit 2c illustrated in FIG. 7. Alternatively, the noise determination unit 2d may determine environmental noise based on a noise component output from the amplitude variation prediction unit 74. The noise determination unit 2d outputs a result of the environmental noise determination to the control unit 1.

The control unit 1 includes a presentation control unit 1a. The presentation control unit 1a executes various kinds of processing related to display and sound output. The sound collection apparatus 10 includes a presentation unit 6. The presentation unit 6 may be configured of a display apparatus or speaker (not illustrated) or the like. The presentation unit 6 may be configured of, for example, a LED 48 (refer to FIG. 4) provided on the front surface of the housing 10a. The presentation control unit 1a can cause the presentation unit 6 to display a result of the determination by the noise determination unit 2d. For example, when it is determined based on a result of the environmental noise determination that environmental noise has a noise level higher than a predetermined threshold, the presentation control unit 1a may cause the presentation unit 6 to perform a display indicating that sufficient voice recognition performance cannot be obtained and dictation is impossible with the environmental noise at the acquired level. For example, when the LED 48 is employed as the presentation unit 6, the presentation control unit 1a may flash the LED 48 in red to present that dictation is impossible.

When the presentation unit 6 is configured of the LED 48, the presentation control unit 1a may flash the LED 48 in blue to indicate that the environmental noise determination is being performed, or may light the LED 48 in blue to indicate that the level of environmental noise is relatively low and dictation is possible.

When an LCD (not illustrated) is employed as the presentation unit 6, the presentation control unit 1a may display a result of the environmental noise determination on a display screen of the presentation unit 6. For example, the presentation control unit 1a may display, on the display screen of the presentation unit 6, an error message such as "dictation is impossible with current environmental noise".

When the presentation unit 6 is configured of a speaker, the error message may be outputted from the speaker in sound.

The sound collection apparatus 10 includes an operation unit 3. The operation unit 3 includes various keys and buttons and outputs an operation signal based on a user operation to the control unit 1. For example, in the example illustrated in FIG. 4, a recording start button 49a, a stop button 49b, a reproduction start and temporary stop button 49c, a rewind button 49d, and a fast-forward button 49e are disposed as the operation unit 3 on the front surface of the housing 10a. In addition, for example, mode buttons 50a and 50b for transition to an environmental noise determination mode, and a button 50c for instructing dictation start are provided as the operation unit 3 on the front surface of the housing 10a.

The control unit 1 receives an operation signal based on a user operation through the operation unit 3 and controls each component based on the operation signal. For example, the user can perform, through the operation unit 3, an operation to control the directional characteristic of the microphone unit 2a, and the control unit 1 can set, to the microphone unit 2a, a directional characteristic in accordance with a user operation.

The sound collection apparatus 10 also includes a posture determination unit 4. The posture determination unit 4 is configured of, for example, an acceleration sensor or a gyro sensor. The posture determination unit 4 determines a posture of the housing 10a of the sound collection apparatus 10 and outputs a result of the determination to the control unit 1. A sound quality adjustment unit 7 can adjust, under control of the control unit 1, a frequency characteristic of voice collected by the sound collection unit 2. The sound collection apparatus 10 also includes a clock unit 8. The clock unit 8 generates time information and outputs the time information to the control unit 1.

The sound collection apparatus 10 includes a communication unit 5. The communication unit 5 can perform, under control of the control unit 1, data transmission and reception with an external device in a wired or wireless manner. For example, the communication unit 5 is configured to be able to perform wired communication of a USB standard, wireless LAN communication of Wifi or the like, or wireless communication of Bluetooth (registered trademark). The control unit 1 can transmit, for example, an intact voice signal collected by the microphone unit 2a, a voice signal after being subjected to directional characteristic control, a voice signal after being subjected to noise reduction processing, or a voice signal after being subjected to sound adjustment to an external device through the communication unit 5.

The sound collection apparatus 10 includes a filter information recording unit 9. The filter information recording unit 9 records information on a filter characteristic of the filter unit 42. The control unit 1 can correct the frequency characteristic of the filter unit 42 by setting the sound quality adjustment unit 7 based on the filter characteristic information from the filter information recording unit 9. The control unit 1 can also output a voice signal subjected to the correction through the communication unit 5. The control unit 1 may directly output the filter characteristic information to an external device through the communication unit 5.

Note that the control unit 1 includes a track input unit 1b. The track input unit 1b performs processing of determining a phrase and providing an index to each determined phrase. The sound collection apparatus 10 includes a noise information recording unit 11. The noise information recording unit 11 may be configured of, for example, an IC memory, and records noise information or the like under control of the control unit 1.

The following describes a configuration of the dictation apparatus with reference to FIG. 2. As illustrated in FIG. 2, this dictation apparatus 20 includes a control unit 21. The control unit 21 includes a processor such as a CPU and may be configured to operate in accordance with a computer program stored in a memory (not illustrated) to control each component. The processor may be partially replaced with a hardware electronic circuit.

The dictation apparatus 20 includes a communication unit 22. The communication unit 22 can perform, under control of the control unit 21, communication with the communication unit 5 of the sound collection apparatus 10 through a predetermined transmission path. The communication unit 22 can output, to the control unit 21, various voice signals transmitted from the sound collection apparatus 10.

The dictation apparatus 20 includes a text generation unit 23. The text generation unit 23 generates, under control of the control unit 21, a text based on an inputted voice signal by well-known voice recognition processing. A recording unit 24 includes a voice-text generation dictionary unit 24a used for the text generation. The text generation unit 23 calculates a feature value of a voice signal, performs matching calculation of the calculated feature value and an acoustic model, and generates text from information of human voice included in the voice signal by referring to voice text in the voice-text generation dictionary unit 24a.

The recording unit 24 also includes a format information unit 24b. The format information unit 24b records format information describing a format for generating a predetermined document from voice information generated in text. A document generation unit 21c of the control unit 21 refers to the format information in the format information unit 24b and generates a document from the voice information generated in text.

Figure 8:
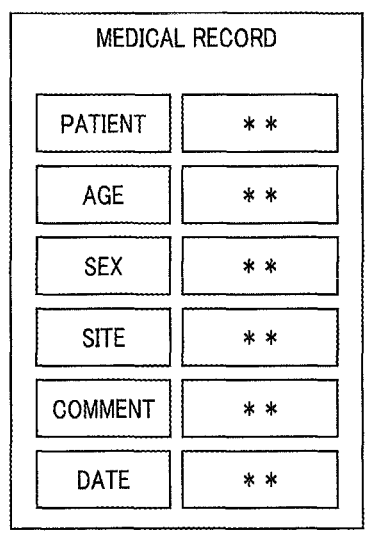
FIG. 8 is an explanatory diagram for description of an exemplary document generated by a document generation unit 21c.

FIG. 8 is an explanatory diagram for description of an exemplary document generated by the document generation unit 21c. FIG. 8 illustrates an example in which a medical record is generated as a document. The document generation unit 21c acquires a format of a medical record from the format information and generates a document of the medical record. The medical record illustrated in FIG. 8 includes items of "patient", "age", "sex", "site", "comment", and "date".

For example, a doctor speaks in an order of the items of the medical record in FIG. 8. In such a case, the text generation unit 23 sequentially generates text to be set to each item by generating text from voice spoken in the order of the items. The document generation unit 21c generates a medical record by disposing the sequentially acquired text in a column of each item.

The document generation unit 21c may determine content of information generated in text and dispose the information generated in text in each column in the medical record. For example, when a person name is generated in text, the document generation unit 21c may dispose the name generated in text in the column of "patient". For example, when voice spoken as "x years old" is generated in text, the document generation unit 21c may dispose the age generated in text in the column of "age". For example, the document generation unit 21c may determine an input operation to each item when a string generated in text matches with a string in the item. For example, text of voice that is inputted following sound of "patient" may be disposed in the column of "patient". In this manner, the medical record is automatically generated by the document generation unit 21c.

The control unit 21 includes a recording-reproduction control unit 21a. The recording-reproduction control unit 21a can provide the recording unit 24 with various voice signals inputted through the communication unit 22 and record the voice signals in the recording unit 24. The recording-reproduction control unit 21a can read voice recorded in the recording unit 24 and reproduce the voice. The text generation unit 23 and the document generation unit 21c can perform text generation processing and document generation processing based on a reproduced voice signal.

The control unit 21 also includes a voice processing unit 21b. The voice processing unit 21b can perform various kinds of voice processing on a voice signal received through the communication unit 22 or a voice signal reproduced by the recording-reproduction control unit 21a. The voice processing unit 21b can perform, for example, directionality control, noise reduction processing, and sound quality adjustment processing same as the directionality control, the noise reduction processing, and the sound quality adjustment processing performed by the directionality control unit 2b of the sound collection apparatus 10. Accordingly, when a voice signal acquired by the microphone unit 2a is directly provided from the sound collection apparatus 10, the text generation unit 23 and the document generation unit 21c can effectively perform the text generation processing and the document generation processing through the voice processing by the voice processing unit 21b.

The following describes a reproduction-recording device 30 with reference to FIG. 3. FIG. 3 indicates that, for example, a personal computer 30a can be employed as the reproduction-recording device 30, and the reproduction-recording device 30 can be configured of the personal computer 30a. In this case, a keyboard 34a for operating the personal computer 30a corresponds to an input unit 34 of the reproduction-recording device 30, and a hard disk (not illustrated) included in the personal computer 30a corresponds to a recording unit 33 of the reproduction-recording device 30.

The reproduction-recording device 30 includes a communication unit 31. The communication unit 31 can perform communication with the communication unit 5 of the sound collection apparatus 10 through a predetermined transmission path. The communication unit 31 can output, to a voice reproduction unit 32, various voice signals transmitted from the sound collection apparatus 10.

The voice reproduction unit 32 includes a speaker (not illustrated) and outputs voice based on a voice signal received through the communication unit 31. An operator 35 of the personal computer 30a inputs text by operating the input unit 34 (the keyboard 34a) while listening to the voice outputted from the voice reproduction unit 32. Text data is stored in the recording unit 33 by an input operation through the input unit 34.

Figure 9:
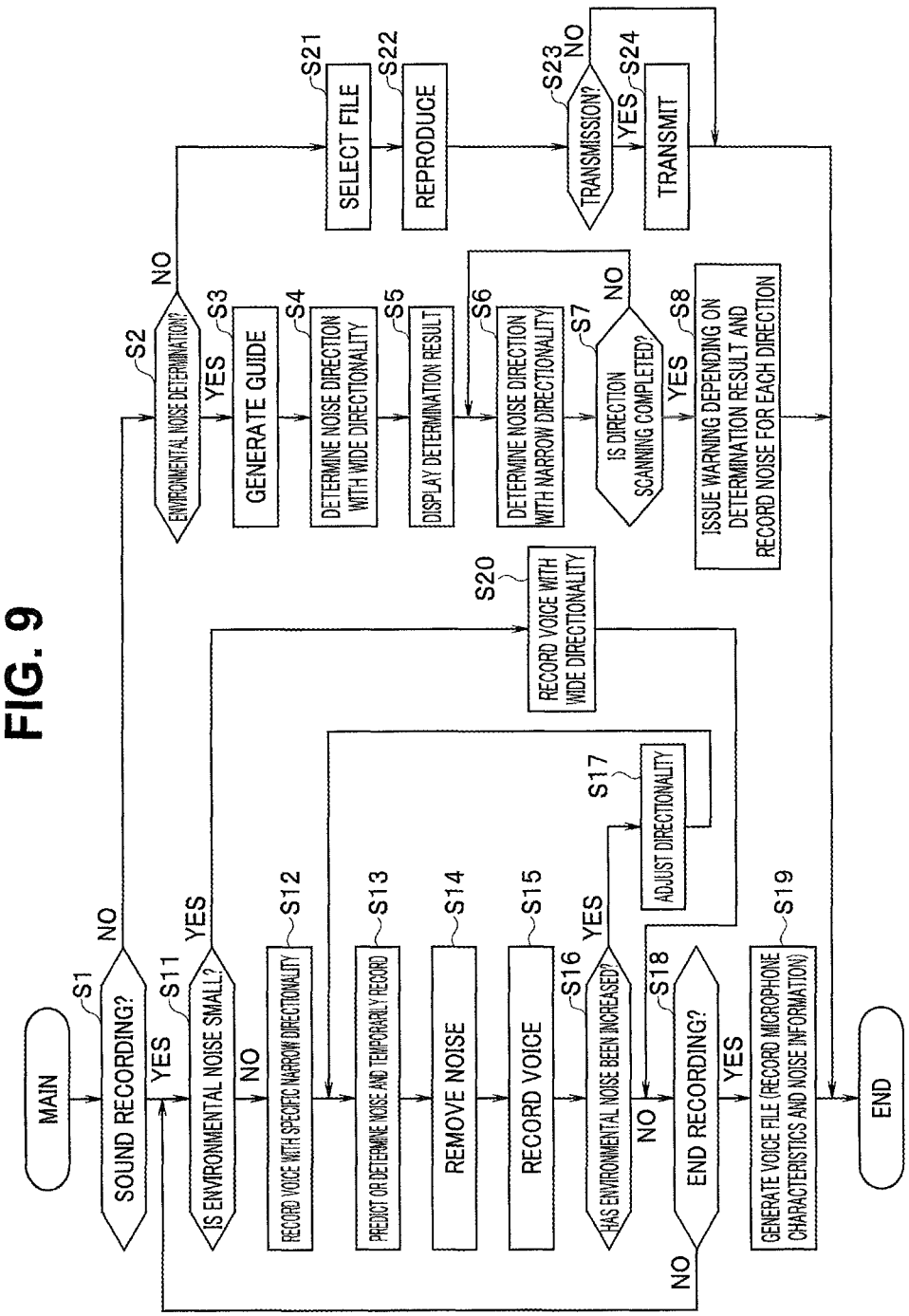
FIG. 9 is a flowchart for description of operation of the sound collection apparatus.
Figure 10:
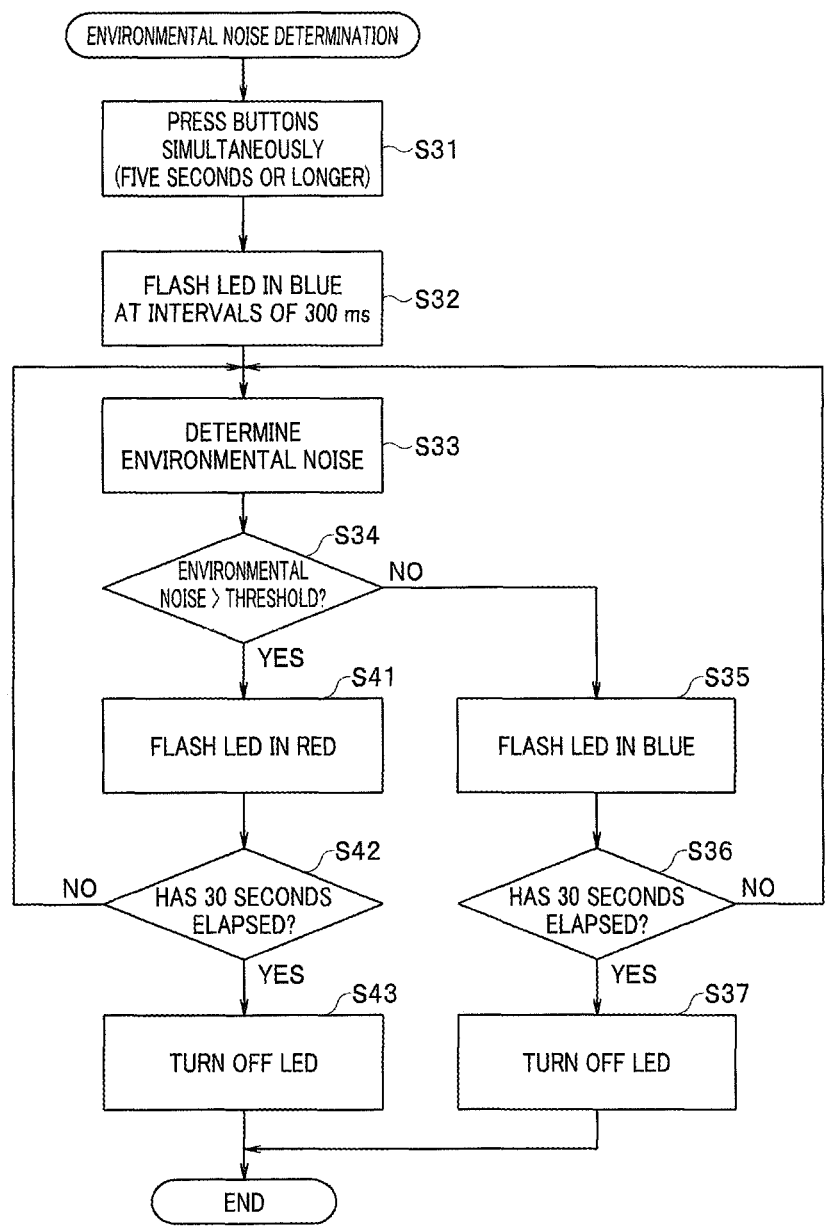
FIG. 10 is a flowchart illustrating an exemplary specific procedure of environmental noise determination processing.
Figure 11A:
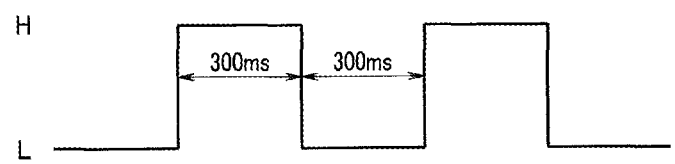
Figure 11B:
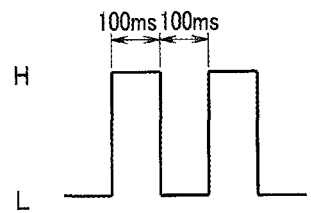
Figure 12A:
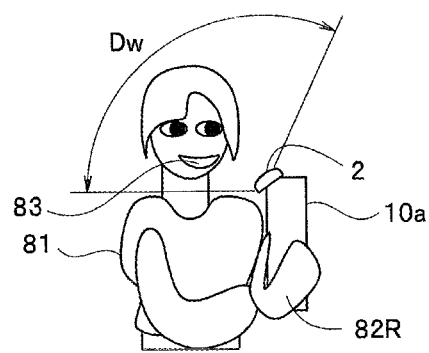
FIG. 12A is an explanatory diagram for description of operation of the embodiment.
Figure 12B:
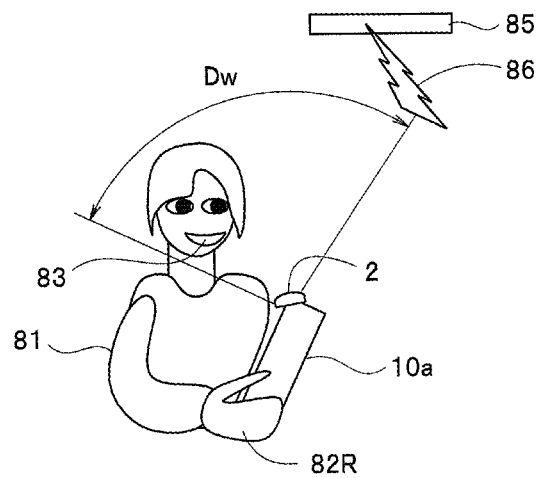
FIG. 12B is an explanatory diagram for description of operation of the embodiment.
Figure 12C:
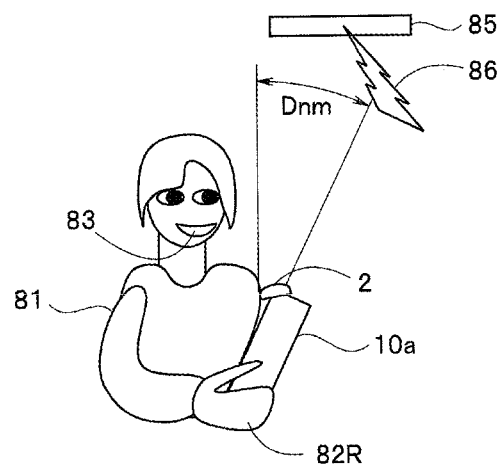
FIG. 12C is an explanatory diagram for description of operation of the embodiment.
Figure 12D:
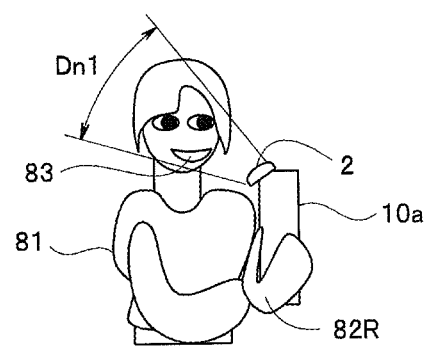
FIG. 12D is an explanatory diagram for description of operation of the embodiment.
Figure 12E:
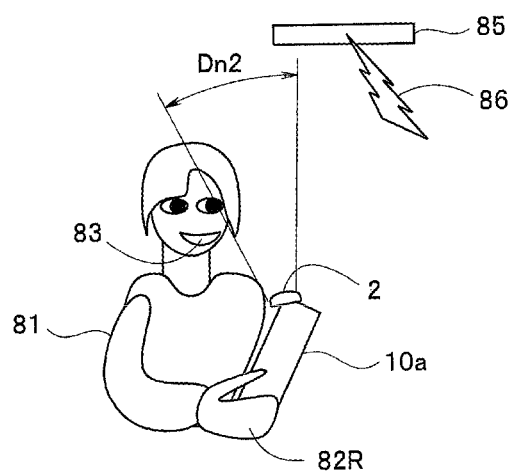
FIG. 12E is an explanatory diagram for description of operation of the embodiment.
Figure 13:
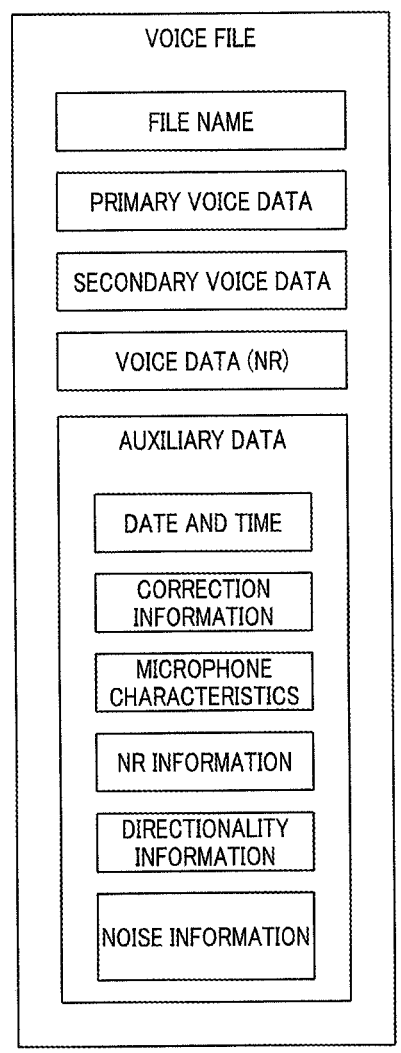
FIG. 13 is an explanatory diagram illustrating an exemplary configuration of a voice file.
Figure 14:
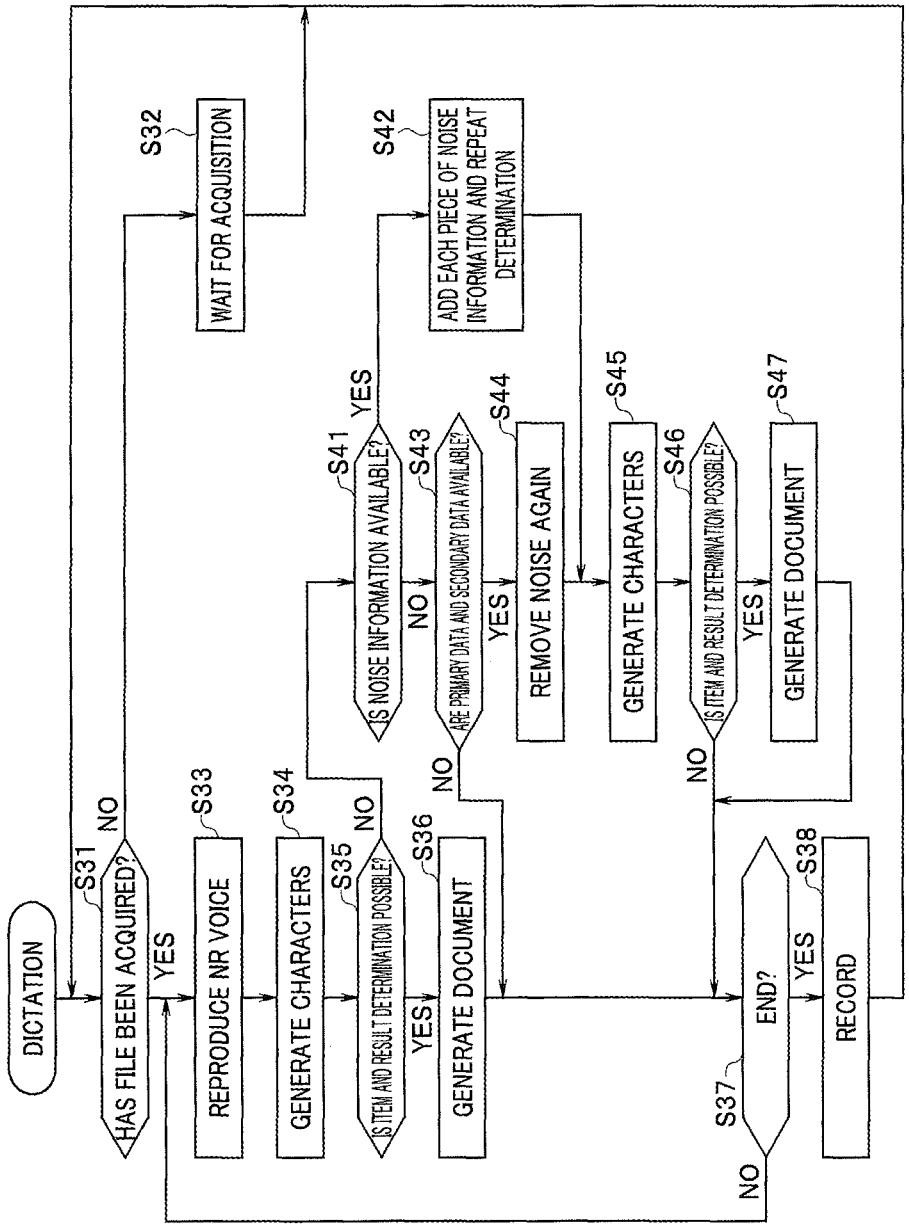
FIG. 14 is a flowchart for description of operation of a dictation apparatus.

The following describes operation of the embodiment thus configured with reference to FIGS. 9 to 14. FIG. 9 is a flowchart for description of operation of the sound collection apparatus. FIG. 10 is a flowchart illustrating an exemplary specific procedure of environmental noise determination processing. FIGS. 11A and 11B are each an explanatory diagram for description of LED lighting control by the presentation control unit 1a. FIGS. 12A to 12E are each an explanatory diagram for description of operation of the embodiment. FIG. 13 is an explanatory diagram illustrating an exemplary configuration of a voice file. FIG. 14 is a flowchart for description of operation of the dictation apparatus.

(Sound Collection)

FIGS. 12A to 12E each illustrate a situation in which the sound collection apparatus in the present embodiment is used. FIG. 12A illustrates a situation in which a user 81 grasps the housing 10a with a right hand 82R. For example, at dictation in the present embodiment, the user 81 speaks while a mouth is positioned close to the microphone unit 2a included in the sound collection unit 2 to improve voice recognition accuracy. For example, as illustrated in FIGS. 12A and 5, the user 81 grasps the housing 10a with the right hand 82R and speaks while a mouth 83 (in FIG. 5, the mouth 52) is positioned close to the filter unit 42 so that voice can be easily acquired by the front microphone 2a1. Note that a sound collection range Dw illustrated in FIG. 12A is the sound collection range of the microphone unit 2a including the front microphone 2a1 and the back microphone 2a2. FIG. 12A illustrates a state in which the sound collection range is set to be a relatively wide sound collection range by directionality control.

At step S1 in FIG. 9, the control unit 1 determines whether a sound recording mode is set. For example, transition to the sound recording mode is made when the recording start button 49a illustrated in FIG. 4 is operated. Note that, since the sound collection apparatus 10 illustrated in FIG. 1 includes no recording unit for sound recording, processing of transmitting, from the communication unit 5, various voice signals obtained through sound collection is performed in the sound recording mode, and the voice signals are recorded in the recording unit 24 at the dictation apparatus 20 illustrated in FIG. 2. Thus, sound recording in FIG. 9 means sound collection for the sound collection apparatus 10. Thus, FIG. 9 illustrates operation of an apparatus such as an IC recorder including the sound collection apparatus 10 and the dictation apparatus 20. Note that the sound collection apparatus 10 illustrated in FIG. 1 may include a recording unit for sound recording so that sound recording can be performed by the sound collection apparatus 10 alone. Note that sound recording does not necessarily need to be performed at dictation, but is preferably performed when dictation processing is performed at an external device or a computer on a cloud (not illustrated).

In the present embodiment, an environmental noise determination mode is executed before dictation work. The control unit 1 may automatically transition to the environmental noise determination mode when turned on, or may transition to the environmental noise determination mode based on a user operation. For example, the transition to the environmental noise determination mode may be performed when a user simultaneously presses the mode buttons 50a and 50b as illustrated in FIG. 4 for a predetermined number of seconds (for example, five seconds).

When having determined that the sound recording mode is not specified at step S1, the control unit 1 determines whether the environmental noise determination mode is specified at step S2. When having determined that the environmental noise determination mode is not specified at step S2, the control unit 1 transitions to step S21. Steps S21 to S24 indicate control by the control unit 21 of the dictation apparatus 20. The control unit 21 selects a voice file from the recording unit 24 based on a user operation (step S21), and reproduces voice (step S22). The control unit 21 determines whether transmission is requested by the user (step S23). When transmission is requested, the control unit 21 performs the transmission (step S24).

Steps S2 to S8 in FIG. 9 indicate the environmental noise determination processing. Steps in FIG. 10 indicate specific examples of procedures at steps S2 to S5 in FIG. 9. At step S31 in FIG. 10, the control unit 1 transitions to the environmental noise determination mode when the buttons 50a and 50b are simultaneously pressed for five seconds or longer.

When the environmental noise determination mode is specified, the control unit 1 transitions from step S2 to step S3 in FIG. 9, and generates guide. The guide notifies the user of the transition to the environmental noise determination mode. For example, the control unit 1 instructs, by sound or screen display, no voice production while the housing 10a of the sound collection apparatus 10 is held close to the mouth. In the example illustrated in FIG. 10, the control unit 1 presents the transition to the environmental noise determination mode by flashing the LED 48 in blue at step S32.

FIG. 11A illustrates flashing control of the LED 48 in such a case. In the example illustrated in FIG. 11A, a high level (H) indicates a turned-on state, and a low level (L) indicates a turned-off state. FIG. 11A illustrates that flashing is performed at intervals of 300 ms (milliseconds).

The user 81 can recognize the transition to the environmental noise determination mode based on guide display or a flashing state of the LED 48. Accordingly, the user can be prevented from changing the posture of the housing 10a or from performing unnecessary speech while the environmental noise determination mode is executed.

Subsequently, the control unit 1 performs noise determination at step S4 in FIG. 9 (step S33 in FIG. 10). In this case, the control unit 1 controls the directionality control unit 2b to set the sound collection range of the microphone unit 2a to be a widest sound collection range. The noise determination unit 2d of the sound collection unit 2 performs environmental noise level determination and outputs a result of the determination to the control unit 1. The control unit 1 displays the determination result on the presentation unit 6 (step S5). Note that, when the directional characteristic of the microphone unit 2a is set by the user 81, environmental noise may be determined in a state with the directional characteristic set by the user.

For example, the control unit 1 determines, based on the determination result, whether voice recognition performance necessary for dictation can be obtained. For example, at step S34 in FIG. 10, the control unit 1 determines whether the level of environmental noise is higher than a predetermined threshold. The control unit 1 may determine that voice recognition performance necessary for dictation cannot be obtained when the level of environmental noise is higher than the predetermined threshold, or may determine that voice recognition performance necessary for dictation can be obtained when the level of environmental noise is equal to or lower than the predetermined threshold.

When having determined that the level of environmental noise is relatively low and voice recognition performance necessary for dictation can be obtained, the control unit 1 causes the presentation control unit 1a to light the LED 48 in blue (step S35). Subsequently, the control unit 1 determines whether the lighting has continued for a predetermined time period (for example, 30 seconds) (step S36). When the lighting in blue has continued for the predetermined time period, the control unit 1 transitions to step S37 to turn off the LED 48, and ends the processing. Note that the processing is returned to step S33 until the blue lighting time period becomes equal to the predetermined duration.

Consider a situation, as illustrated in FIG. 12B, in which an air conditioning apparatus 85 exists in a direction in the sound collection range Dw and generates noise 86 at relatively high level. In such a case, the level of environmental noise potentially becomes higher than the predetermined threshold. When having determined that the level of environmental noise is relatively high and voice recognition performance necessary for dictation cannot be obtained, the control unit 1 causes the presentation control unit 1a to flash the LED 48 in red (step S41). FIG. 11B illustrates flashing control of the LED 48 in such a case. In the example illustrated in FIG. 11B, relatively fast flashing is performed at intervals of 100 ms (milliseconds).

Based on the relatively fast flashing of the LED 48 in red, the user 81 can recognize, before dictation work, that the level of environmental noise is high and sufficient voice recognition performance cannot be obtained. The control unit 1 determines whether the fast flashing has continued for a predetermined time period (for example, 30 seconds) (step S42). When the fast flashing in red has continued for the predetermined time period, the control unit 1 transitions to step S43 to turn off the LED 48, and ends the processing. Note that the processing is returned to step S33 until the red flashing time period becomes equal to the predetermined duration.

In the present embodiment as described above, the level of environmental noise is determined and the result of the determination is presented to the user before start of dictation work. Accordingly, the user can check in advance of the dictation work, for example, whether voice recognition performance necessary for dictation can be obtained.

In addition, in the present embodiment, scanning for specifying a direction to an environmental noise source can be performed to improve voice recognition performance. At step S6, the control unit 1 narrows the sound collection range of the microphone unit 2a and changes the sound collection range to determine environmental noise. The control unit 1 determines the posture of the housing 10a based on an output from the posture determination unit 4. For example, the control unit 1 determines a state of a predetermined posture of the housing 10a, which is determined by the posture determination unit 4, to be a reference posture in, for example, an orthogonal coordinate system. Then, the control unit 1 determines each beam direction of the microphone unit 2a with respect to the reference posture, calculates environmental noise for each beam direction, and records the calculated environmental noise as noise distribution information in the noise information recording unit 11. That is, the noise distribution information is obtained by calculating noise direction and intensity as noise distribution in a duration in which environmental noise is determined.

FIG. 12C illustrates scanning for specification of the direction of a noise source, in which the microphone unit 2a has a sufficiently narrow sound collection range Dnm. In the example illustrated in FIG. 12C, the air conditioning apparatus 85 is positioned in a direction of the sound collection range Dnm, and thus the level of environmental noise is relatively high in the sound collection range Dnm due to the noise 86. The control unit 1 obtains, as noise distribution information, distribution in the direction of each noise source and the level of noise due to the noise source with respect to the reference posture by changing the beam direction while the sound collection range of the microphone unit 2a is narrowed down.

At step S7, the control unit 1 determines whether the scanning is performed in every direction in which the scanning can be performed. The control unit 1 repeats the processing at steps S6 and S7 until the scanning is performed in all directions. When the scanning ends in all directions, at step S8, the control unit 1 records, in the noise information recording unit 11, the noise distribution information obtained for each direction and emits warning depending on a result of the scanning. For example, when it is determined, for all scanning directions, that the level of an environmental noise source is higher than a predetermined threshold and voice recognition performance necessary for dictation cannot be obtained, the control unit 1 causes the presentation unit 6 to perform display or output sound indicating the determination. Alternatively, the presentation unit 6 may present a direction in which an environmental noise source at a level equal to or higher than a predetermined level exists.

Next, consider a case in which the user 81 specifies the sound recording mode to start dictation work. When having determined that the sound recording mode is specified at step S1, the control unit 1 determines whether the level of environmental noise is lower than a predetermined threshold at step S11. When the level of environmental noise is lower than the predetermined threshold, for example, when it is determined that the level of environmental noise is relatively low at step S4, the control unit 1 transitions to step S20 where the control unit 1 performs sound collection while a wide sound collection range is set, transmits collected voice or the like through the communication unit 5, and records the collected voice or the like in the dictation apparatus 20. Since the level of environmental noise is relatively low in this case, sufficient voice recognition performance is expected to be obtained.

For example, as illustrated in FIG. 12A, the user 81 grasps the housing 10a with the right hand 82R and speaks while the mouth 83 is positioned close to the microphone unit 2a. The sound collection unit 2 acquires voice of the user 81 and outputs, to the control unit 1, intact voice data acquired by the microphones 2a1 and 2a2, voice data after being subjected to directionality control by the directionality control unit 2b, and voice data after being subjected to noise removal by the NR unit 2c. Note that the sound collection unit 2 also outputs directionality information related to directionality and NR information related to noise reduction processing to the control unit 1. The control unit 1 externally transmits various kinds of voice data from the sound collection unit 2 through the communication unit 5 directly or after being subjected to sound quality adjustment by the sound quality adjustment unit 7. Note that the control unit 1 may also externally transmit directionality information, NR information, and filter information recorded in the filter information recording unit 9 through the communication unit 5.

When having determined that the level of environmental noise is equal to or higher than the predetermined threshold at step S11, the control unit 1 sets a predetermined beam direction with a narrow sound collection range and starts voice recording at step S12. For example, the beam direction may be a direction at an angle θ illustrated in FIG. 4.

FIG. 12D illustrates a state in which sound collection is performed in a narrow sound collection range. A sound collection range Dn1 is sufficiently narrow to allow sound recording with reduced influence of a noise source existing in any direction other than the sound collection range Dn1. In this case, too, the sound collection unit 2 acquires voice of the user 81, and obtains intact voice data acquired by the microphones 2a1 and 2a2 and voice data after being subjected to directionality control by the directionality control unit 2b. At step S13, the NR unit 2c predicts noise and obtains a result of noise determination. The control unit 1 records the result of the noise determination at the NR unit 2c as the noise information in the noise information recording unit 11.

Note that the noise information is recorded at each directionality change. Alternatively, the control unit 1 sequentially calculates the noise information in the duration of sound collection, in other words, as the noise information, the result of the noise determination by the NR unit 2c in each time period since start of sound collection.

The NR unit 2c removes noise in a voice signal by using the noise determination result (step S14), and outputs voice data after being subjected to the noise removal to the control unit 1. Note that the control unit 1 also records, in the noise information recording unit 11, NR information related to the noise reduction processing by the NR unit 2c.

The control unit 1 externally transmits various kinds of voice data from the sound collection unit 2 through the communication unit 5 directly or after being subjected to sound quality adjustment by the sound quality adjustment unit 7, and records the voice data in the dictation apparatus 20 (step S15). The control unit 1 may also externally transmit directionality information, NR information, and filter information recorded in the filter information recording unit 9 through the communication unit 5.

At step S16, the control unit 1 determines whether the level of environmental noise becomes higher than the level of environmental noise at start of sound recording. Note that, at step S16, the control unit 1 may determine whether a level of a voice component in voice data becomes lower than the level of the voice component at start of sound recording. At sound recording, the user 81 speaks while grasping the housing 10a of the sound collection apparatus 10 with a hand, and thus, the sound collection range potentially changes when the posture of the housing 10a changes halfway through the sound recording. For example, as illustrated in FIG. 12E, the sound collection range of the microphone unit 2a changes from the sound collection range Dn1 to a sound collection range Dn2 as the posture of the housing 10a changes, and as a result, the air conditioning apparatus 85 as a noise source is positioned in a direction of the sound collection range Dn2. Accordingly, the level of environmental noise becomes higher due to influence of the air conditioning apparatus 85, which can lead to degraded voice recognition performance.

When having determined that the level of environmental noise has become higher, the control unit 1 transitions to step S17 to adjust directionality. That is, the control unit 1 performs directionality control through the directionality control unit 2b based on a position of any noise source indicated by noise distribution information recorded in the noise information recording unit 11 and posture information from the posture determination unit 4 so that the sound collection range does not include a direction of the noise source. Accordingly, the level of environmental noise becomes lower, which leads to improved voice recognition performance. Note that the control unit 1 may perform directionality control to align the sound collection range of the microphone unit 2a at start of sound recording only based on the posture information from the posture determination unit 4. After having adjusted directionality at step S17, the control unit 1 returns to step S13 to continue sound recording.

That is, with the above-described configuration, noise in dictation is determined by changing directionality by a directionality control unit configured to control directionality of a sound collection unit including a plurality of microphones. When the noise is larger than a predetermined level (predetermined reference value), a sound collection direction can be changed while a sound collection range of the sound collection unit is set to be a second range smaller than a first range by the directionality control unit, thereby obtaining favorable dictation voice. That is, an S/N ratio of dictation voice and environmental noise can be improved by restricting an effective range at sound collection. A noise level, which is a generalized term used in the present specification, is obtained through digitalization of a value using an index based on experiment of noise in an office, such as noise criteria (NC) value proposed by acousticians, or a value used for determination of, for example, air conditioning with steady noise having a wide band spectrum. For example, noise may be determined based on a sound pressure level by using NC-40, which is a level at which telephone voice can be recognized, as a reference value. Such a setting is applicable when a level of recognition on microphone is designed to be equivalent to a level of recognition on telephone. Not only the NC-40 needs to be used as a reference value, but analog determination may be employed in accordance with a sound pressure and a frequency. These methods may be switched in accordance with directionality. Alternatively, a fraction of a dynamic range of a microphone may be set as a reference value, or, for example, a maximum sound pressure of voice of a person using a device may be determined, and the maximum measured sound pressure thus determined and an S/N ratio of environmental noise determined at the pressure may be set as a noise level. That is, a reference value may be determined based on a noise level that allows dictation when such a microphone sensitivity or circuit gain is set that voice does not exceed the dynamic range at dictation with maximum voice. In this manner, distribution of noise at dictation can be determined. Thus, when means or procedure for determining the distribution, and means or procedure for recording information of the noise distribution are provided, directionality and the like can be controlled based on the noise distribution to achieve extremely highly reliable dictation voice collection by providing a procedure of performing sound collection while causing the directionality control unit to control a sound collection direction of the sound collection unit so that a noise level at the sound collection unit is lower than a predetermined level (which may be, as described above, set with reference to, for example, the dynamic range of a microphone or the NC value, and may be changed in accordance with directionality, performance of the microphone, or a frequency range for determining voice of a speaker) based on a result of determination of a posture of the sound collection unit and the information of the noise distribution. That is, the directionality can be changed by switching the directionality to improve a ratio (S/N ratio) of dictation voice and environmental noise in sound pressure or the like and decrease an observed value of environmental noise.

At step S18, the control unit 1 determines whether a sound recording end operation has been performed. When the sound recording end operation has not been performed, the control unit 1 returns to step S11. When having detected that the sound recording end operation has been performed, the control unit 1 instructs generation of a voice file at step S19. That is, end of sound recording is notified to the dictation apparatus 20 through the communication unit 5, and the dictation apparatus 20 generates a file of received voice data. The dictation apparatus may record, for example, a microphone characteristic and noise information.

FIG. 13 is an explanatory diagram illustrating an exemplary configuration of a voice file that can be generated from data transmitted from the sound collection apparatus 10.

In the example illustrated in FIG. 13, the voice file includes a file name, primary voice data, secondary voice data, and voice data after being subjected to noise reduction (NR). In addition, the voice file includes auxiliary data such as date and time information, correction information, microphone characteristic information, NR information, directionality information, and noise information for each directionality. Note that the primary voice data and the secondary voice data are voice data after being subjected to directionality control. The voice file may include two pieces of voice data from the microphones 2a1 and 2a2 not subjected to directionality control.

Note that, in FIG. 9, the directional characteristic is adjusted in accordance with environmental noise at sound recording for dictation. However, the sound recording may be performed in a state with a directional characteristic set by the user.

(Dictation)

FIG. 14 illustrates dictation processing executed by the dictation apparatus 20 illustrated in FIG. 2. Note that the processing illustrated in FIG. 14 may be executed by, for example, a computer on a cloud (not illustrated). For example, the recording unit 24 of the dictation apparatus 20 records, in addition to each data illustrated in FIG. 13, a voice file including two pieces of voice data from the microphones 2a1 and 2a2 not subjected to directionality control.

At step S31, the control unit 21 determines whether a voice file as a dictation target is acquired in the recording unit 24. When no voice file is acquired, the control unit 21 waits for the acquisition at step S32. When a voice file as a dictation target is acquired, the control unit 21 reproduces voice data (NR sound) from the recording unit 24, which is subjected to noise reduction (step S33). At step S34, the control unit 21 controls the text generation unit 23 to generate characters from the voice data. Subsequently at step S35, the document generation unit 21c determines whether the generated character text can be determined as an item of a document to be generated and a content of the item. When the determination is possible, the document generation unit 21c generates a document from voice generated in text at step S36. At step S37, the control unit 21 determines whether the document generation has ended. When the document generation has not ended, the control unit 21 returns to step S33. When the document generation has ended, the control unit 21 records the generated document in the recording unit 24 at step S38.

When, at step S35, the document generation unit 21c determines that the generated character text cannot be used to generate a document, the control unit 21 performs noise reduction processing again at steps S41 to S47 and tries document generation. The noise reduction processing potentially removes not only the noise component but also the voice component. Thus, the control unit 21 determines whether noise information is recorded to generate information before being subjected to the noise reduction processing (step S41). When the noise information acquired at step S13 in FIG. 9 is transferred to the dictation apparatus 20 and recorded in the recording unit 24, at step S42, the voice processing unit 21b sequentially adds noise obtained from the noise information to a voice signal in each time period to produce a voice signal before being subjected to the noise reduction processing, and then executes voice recognition again. Subsequently, the text generation unit 23 and the document generation unit 21c try document generation at steps S45 to S47, and then transition to step S37. Note that the processing at steps S45 to S47 is identical to the processing at steps S34 to S36, respectively.

When having determined that no noise information is recorded at step S41, the control unit 21 determines whether the primary voice data and the secondary voice data before being subjected to the noise reduction processing are recorded in the recording unit 24 at step S43. When the data is recorded, the voice processing unit 21b executes the noise reduction processing using the primary voice data and the secondary voice data to remove noise. Subsequently, the text generation unit 23 and the document generation unit 21c try document generation at steps S45 to S47, and then transition to step S37.

Note that, when having determined that the generated character text cannot be used for document generation at steps S41 and S46, the control unit 21 transitions to step S37 without generating a document.

In the present embodiment as described above, when sound collection for dictation is performed by the sound collection apparatus, the level of environmental noise is determined, and a result of the determination is presented to the user. Accordingly, the user can check in advance of dictation work, for example, whether voice recognition performance necessary for dictation can be obtained, thereby preventing unnecessary speech. Since the direction of any noise source can be specified and presented, it is possible to obtain knowledge for improving environment necessary for dictation. Information on distribution of noise sources can be held to control the sound collection range so that noise is reduced or a level of target voice becomes higher, thereby achieving improved voice recognition performance. In addition, the sound collection apparatus in the present embodiment can perform the noise reduction processing on acquired voice and then output resulting voice data, and can also output not only a voice signal after being subjected to noise reduction but also a voice signal before being subjected to noise reduction and noise information. Accordingly, in an apparatus that executes dictation processing, when voice recognition processing on voice after being subjected to the noise reduction processing has low recognition accuracy, the recognition accuracy can be improved by newly performing noise reduction processing and voice recognition processing by using a voice signal before being subjected to the noise reduction processing and noise information.

A noise level, which is a generalized term used in the present specification, may be a value using an index based on experiment of noise in an office, such as NC (noise criteria) value proposed by acousticians. That is, noise may be determined based on a sound pressure level by using the NC-40 described above or the like as a reference value. The NC-40 can be used for determination of, for example, air conditioning with steady noise having a wide band spectrum. Not only the NC-40 needs to be used as a reference value, but analog determination may be employed in accordance with a sound pressure and a frequency. These methods may be switched in accordance with directionality. Alternatively, a fraction of a dynamic range of a microphone may be set as a reference value, or, for example, a maximum sound pressure of voice of a person using a device may be determined, and the maximum measured sound pressure thus determined and an S/N ratio of environmental noise determined at the pressure may be set as a noise level.

The present invention is not limited to the above-described embodiments. When the present invention is performed, any component may be deformed and realized without departing from the scope of the present invention. In addition, various kinds of inventions may be achieved through appropriate combination of a plurality of components disclosed in the above-described embodiments. For example, some of all components indicated in the embodiments may be deleted.

Note that, when any operation processes in the claims, the specification, and the drawings are described with words such as "first" and "subsequently" for sake of convenience, it is not essential to perform the processes in the stated order. Part of each step in the operation processes, which does not affect the gist of the invention may be omitted as appropriate.

Note that, among technologies described above, control mainly described with a flowchart can be often set by a computer program that is recorded in a semiconductor recording medium, any other recording medium, or a recording unit in some cases. The recording to the recording medium or the recording unit may be performed at product shipment, performed by using a distributed recording medium, or performed by downloading through the Internet. External devices may cooperate as necessary to replace some functions and determination.

[Note 1]

A sound collection method includes: a procedure of collecting sound by a sound collection unit including a microphone; a procedure of determining noise in dictation while a sound collection range of the sound collection unit is set to be a first range by a directionality control unit configured to control directionality of the sound collection unit including a plurality of microphones; and a procedure of performing the sound collection for dictation while the sound collection range of the sound collection unit is set to be a second range smaller than the first range by the directionality control unit.

[Note 2]

A sound collection method including a procedure of collecting sound by a sound collection unit including a microphone; a procedure of determining noise in dictation while sound collection range of the sound collection unit is set to be a first range by a directionality control unit configured to control directionality of the sound collection unit including a plurality of microphones; and a procedure of performing, when the noise in dictation is larger than a predetermined level, the sound collection for dictation while the sound collection range of the sound collection unit is set to be a second range smaller than the first range by the directionality control unit.

[Note 3]

In Note 2, the sound collection method further including: a procedure of determining distribution of the noise in dictation by changing a sound collection direction, a procedure of recording information of the noise distribution; and a procedure of performing sound collection by causing the directionality control unit to control a sound collection direction of the sound collection unit so that a level of noise at the sound collection unit becomes smaller than a predetermined level based on a result of determination of a posture of the sound collection unit and the information of the noise distribution.

What is claimed is:

1. A sound collection apparatus comprising:
    a sound collection unit configured to collect sound, the sound collection unit comprises:
        a plurality of microphones, and a directionality control circuit configured to control directionality of the sound collection unit through the plurality of microphones;

a noise determination unit configured to determine noise in dictation based on voice collected by the sound collection unit and to determine distribution of the noise in dictation by changing the directionality of the sound collection unit through the directionality control circuit;

a presentation device configured to perform presentation based on a determination result by the noise determination unit;

a noise information recorder configured to record information of the noise distribution determined by the noise determination unit;

a posture determination sensor configured to determine a posture of the sound collection unit; and a processor configured to cause the directionality control circuit to control the directionality of the sound collection unit so that a noise level at sound collection is decreased based on a determination result by the posture determination sensor and the information of the noise distribution.

2. A sound collection apparatus comprising:

a sound collection unit including a microphone configured to collect sound;

a noise determination unit configured to determine noise in dictation based on voice collected by the sound collection unit;

a presentation device configured to perform presentation based on a determination result by the noise determination unit;

a noise reduction circuit configured to execute noise reduction processing of removing a noise component from the voice collected by the sound collection unit; and a communication device configured to externally transmit the voice collected by the sound collection unit and sound obtained through the noise reduction processing by the noise reduction circuit.

3. A sound collection apparatus comprising:

a sound collection unit configured to collect sound, the sound collection unit comprises:
  a plurality of microphones, and
  a directionality control circuit configured to control directionality of the sound collection unit through the plurality of microphones;

a noise determination unit configured to determine noise in dictation based on voice collected by the sound collection unit and to determine distribution of the noise in dictation by changing the directionality of the sound collection unit through the directionality control circuit;

a presentation device configured to perform presentation based on a determination result by the noise determination unit;

a noise information recorder configured to record information of the noise distribution determined by the noise determination unit;

a noise reduction circuit configured to execute noise reduction processing of removing a noise component from the voice collected by the sound collection unit; and a communication device configured to externally transmit the voice collected by the sound collection unit, the voice obtained through the noise reduction processing by the noise reduction circuit, and information of noise in a duration of sound collection by the sound collection unit.

4. A sound collection method comprising:

a procedure of collecting sound by a sound collection unit including a plurality of microphones;

a procedure of determining noise in dictation based on voice collected by the sound collection unit performed while a sound collection range of the sound collection unit is set to be a first range by a directionality control circuit configured to control directionality of the sound collection unit;

a presentation procedure of performing presentation based on a determination result of the noise; and a procedure of performing the sound collection for the dictation while the sound collection range of the sound collection unit is set to be a second range smaller than the first range by the directionality control circuit.

5. A sound collection method comprising:

a procedure of collecting sound by a sound collection unit including a plurality of microphones;

a procedure of determining noise in dictation based on voice collected by the sound collection unit performed while a sound collection range of the sound collection unit is set to be a first range by a directionality control circuit configured to control directionality of the sound collection unit;

a presentation procedure of performing presentation based on a determination result of the noise;

a procedure of determining, when the noise in dictation is larger than a predetermined level, distribution of the noise in dictation by changing a sound collection direction while the sound collection range of the sound collection unit is set to be a second range smaller than the first range by the directionality control circuit;

a procedure of recording information of the noise distribution; and a procedure of performing sound collection by causing the directionality control circuit to control a sound collection direction of the sound collection unit so that a level of noise at the sound collection unit becomes smaller than a predetermined level based on a determination result of a posture of the sound collection unit and the information of the noise distribution.

6. A dictation method comprising:

a procedure of reading, from a recorder recording first sound collected by a sound collection unit, second sound acquired by performing noise reduction processing on the collected first sound, and information of noise in a duration of sound collection by the sound collection unit, and generating a document by performing first dictation processing through voice recognition of the read second sound;

a procedure of generating, when the document cannot be generated by the first dictation processing, a document by reading the second sound and the noise information and performing second dictation processing through voice recognition of third sound acquired by adding noise based on the noise information to the read second sound; and a procedure of generating, when the document cannot be generated by the second dictation processing, a document by performing third dictation processing through voice recognition of fourth sound acquired by performing noise reduction processing on the first sound.

* * * * *